UNITED STATES PATENT OFFICE 2,376,962

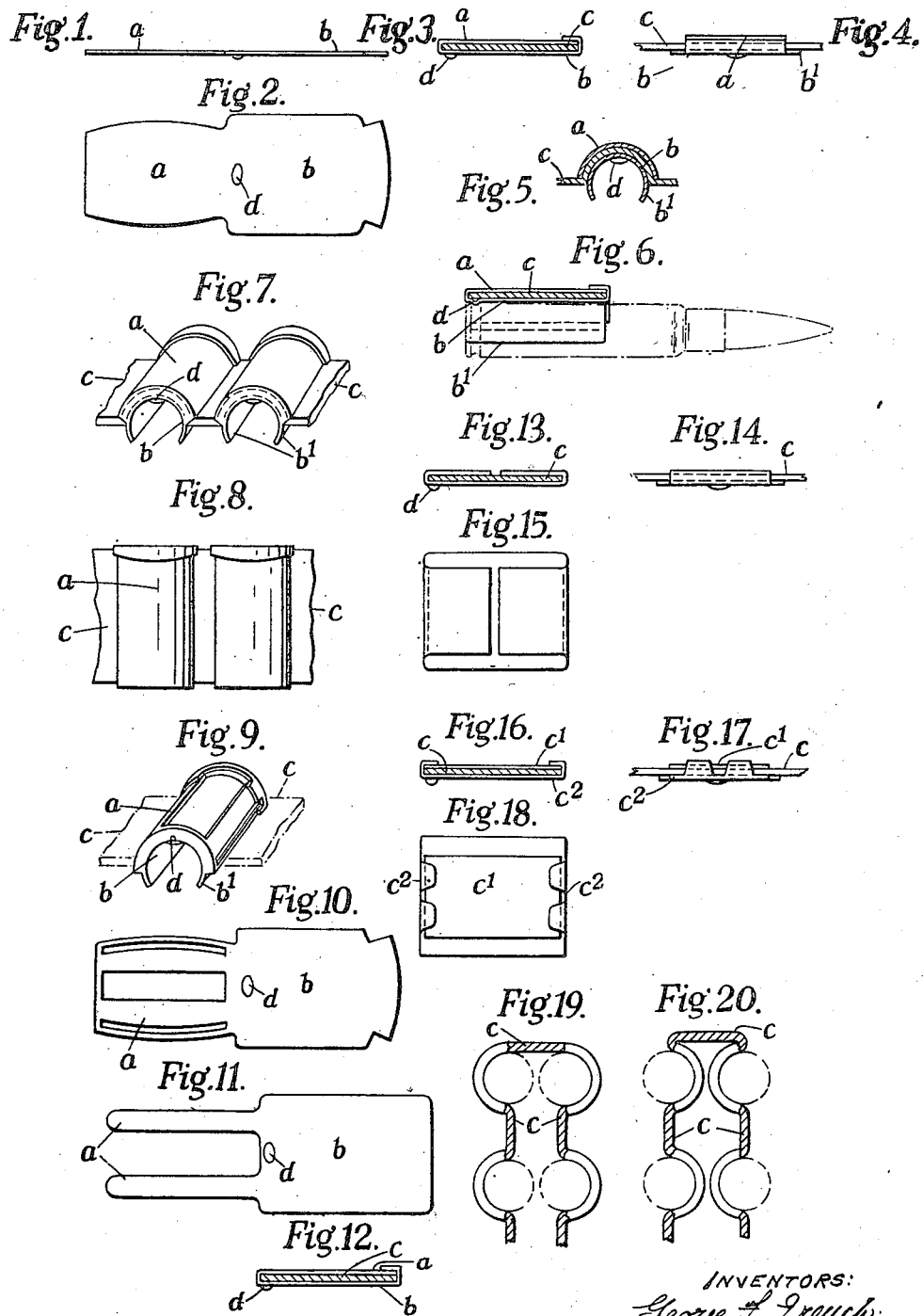

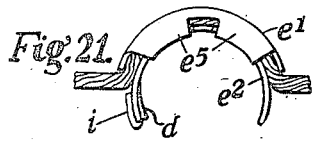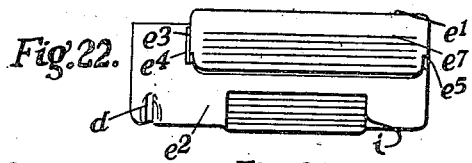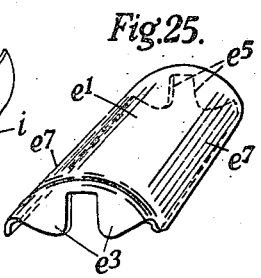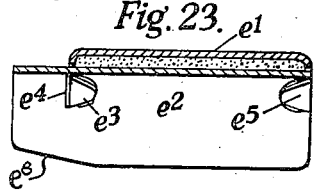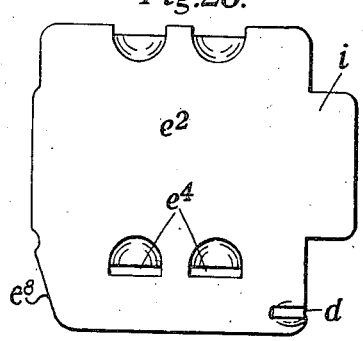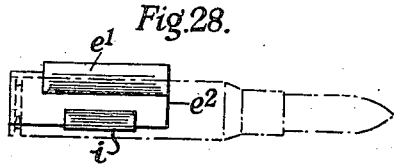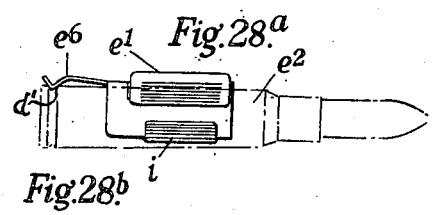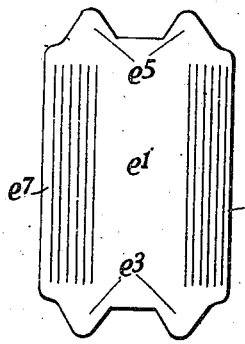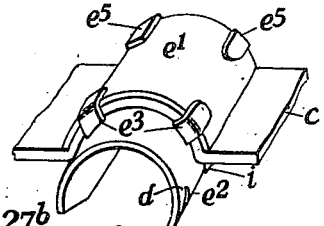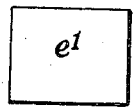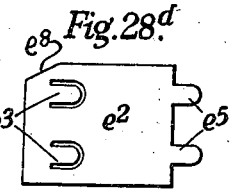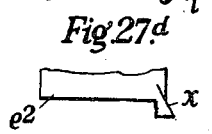

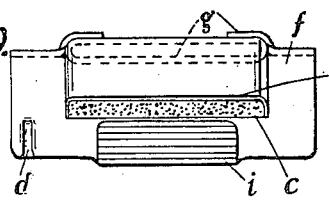
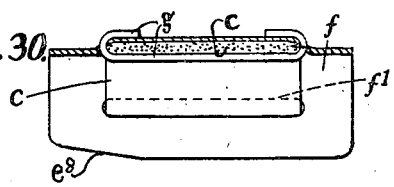
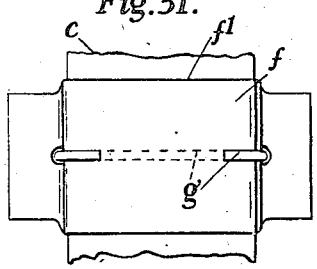
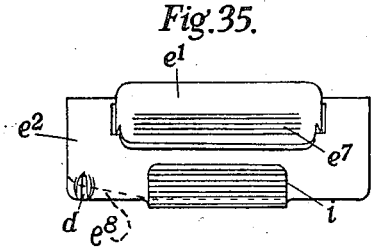
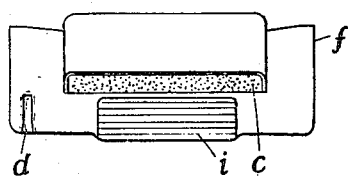
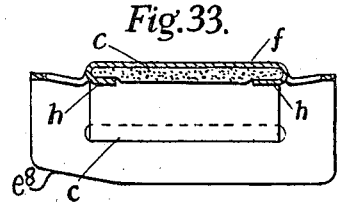
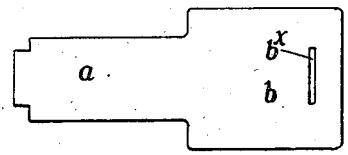
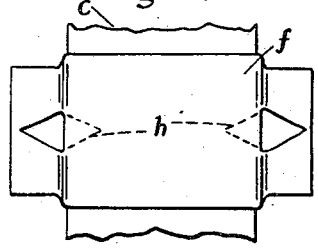
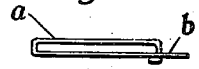

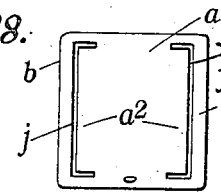
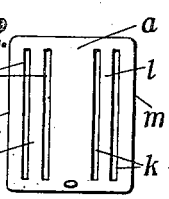
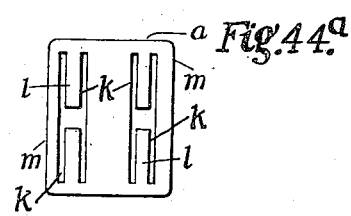
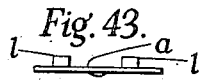
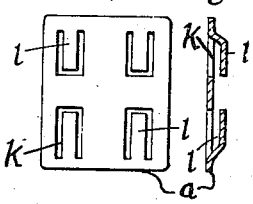
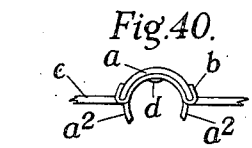
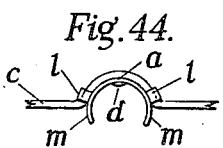
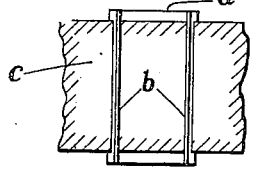
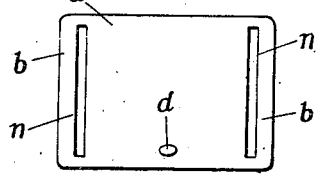
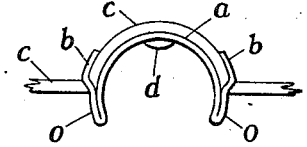
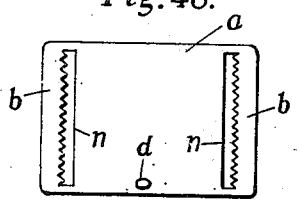
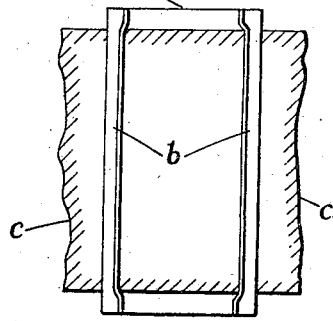

MACHINE GUN CARTRIDGE BELT AND THE LIKE

George Frederick French and Roger French, Manchester 15, England

Application July 22, 1941, Serial No. 403,584
In Great Britain November 19, 1938

12 Claims. (Cl. 89—35)

This invention refers to cartridge-holding belts, and, in particular, those used with quick-firing machine guns, and of the kind which allows of the cartridges being each directly ejected by a forward movement of the ejector slide, or allows of the cartridge being first drawn out of the holder or clip, then lowered, and then fed forward for firing, one method of ejecting being called "two stroke" and the other method called "four stroke."

Belts of the known kind are usually made wholly of metal, each cartridge holder or clip being hinged to its neighbours and the whole belt forming a continuous line of hinged, U-shaped elements, one for each cartridge. Such make of belt is relatively heavy and costly to produce; moreover, it does not lend itself to compact folding and storing in small compass when not in use, and, if folded with small folds, is liable to strain and deform the holders or clips, or their hinge connections.

The object of this invention is a construction of cartridge-holding belt of improved general utility and reliability, which can be more readily and cheaply produced than the known all-metal belt, which is lighter in weight, which is more generally flexible, and allows of being folded on itself in small folds and stored in small compass without straining any of the holders or clips.

According to the invention, the improved belt comprises a flexible carrier member of the required length and width of belt, and composed of one or more lengths of flexible material. It also comprises a plurality of cartridge holders or clips through which the carrier member passes, each holder or clip being made of thin pliable sheet metal or like material, and the several holders or clips being applied to the carrier member at short and even distances apart, but independent of each other, and only held in their respective positions by their connection with the carrier member. Each holder or clip encloses a portion or portions of the carrier member, both width-wise and edge-wise, and is finally shaped and held thereto solely by deformation under pressure. The carrier member enters and leaves each holder or clip at points substantially opposite to and parallel with the axial centre line of the holder or clip, and thus allows of the complete belt being folded on itself in relatively small bends (without straining or damaging the holders or clips), and caused to occupy a minimum of space when requiring to be placed in the usual belt-carrier boxes. The holders or clips may either be the same thickness for their full length, or they may be of reduced thickness at one, or both ends, and at least, the end which passes between the usual guide flanges of the machine gun feed-box.

The carrier member will preferably consist of a single length of woven webbing, but it may consist of a length, or lengths of braid, or tape, or a series of lengths of cord or wire, or a length or lengths of plastic material, leather, small link chains, or even a length of thin ribbon metal. When of webbing, it may be reinforced by fine wire warps, or treated with a stiffening substance, and also in the case of webbing, braid, tape or cords, it, or they, may be treated with an antimildew preparation. The holders or clips, also the belt, when of metal, may also be treated to prevent electrolytic action. To simplify the description, the carrier member (except in the claims) will hereinafter be referred to as the "belt."

In one example of the invention, each holder or clip is formed from a single strip of thin sheet metal (preferably mild steel), first folded upon itself to provide two arms, and such arms then caused to overlap, or inter-engage, at their free ends, the complete unit being applied to the belt either before, or after, such overlapping of the ends, and, in one case, transversely of the belt, and, in the other case, endwise of the belt. One arm of the unit is wider than the other, and, on the unit being given the required preliminary clip shape, such wider arm provides the jaws by which the cartridge is held. When in position on the belt, the unit is then subjected to pressure to cause it to be of the required final shape to grip a cartridge and also to grip the belt under deformation, the two arms being forced together and the complete unit partaking of a cross-section which causes it to grip the belt by reason of its response to the pressure, and according to the relationship of its parts to the width and thickness, or formation of the belt, no other means being employed in such fixing.

In another example of the invention, each holder or clip is formed from two strips of thin sheet metal (preferably mild steel), with one wider than the other, and overlapping or inter-engaging with each other at their ends, the complete unit, when applied thereto, enclosing a portion of the belt, both width-ways and edge-ways. Under pressure and by deformation, as in the previous example, the unit becomes finally shaped and fixed to the belt. The said wider strip, when the clip is given its final shape, provides the cartridge-gripping jaws.

In a further example, the holders or clips each consist of two strips of thin sheet metal (mild steel, for example) preformed to the required curved shape in cross-section and one strip longer and wider than the other, whilst through the medium of small claws in one with one of the strips, and under pressure and deformation, after the wider and longer strip has been placed below and the shorter and narrower strip has been placed above the belt, and the claws of one strip caused to engage the other strip, they, the strips, become fixed to the belt, the wider and longer strip providing the necessary spring jaws for gripping the cartridge.

In another example, the holders or clips each consist of a single strip of thin sheet metal (preferably mild steel) with a raised (embossed) longitudinal central part and with a slot alongside each longitudinal edge of the raised part, the belt passing through the slots and lying within the raised portion prior to and when the holder or clip is fixed thereto. Such fixing is effected with the aid of a wire staple, or small claws struck out of the end parts of the holder or clip, and, under pressure, cause the staple, or claws, in conjunction with the raised part of the holder or clip, to close in, and by deformation, grip the belt. The width of the strip is such as to provide the necessary jaws for holding the cartridge.

In alternative examples of the single-strip holder or clip, the strip, which is of rectangular and slightly elongated shape in plan, is formed with a single slot, or a pair of slots, near to each of its two longitudinal edges, through which the belt passes, and also over the central part of the strip, and when in position, the strip is subjected to pressure to give it the required clip shape and to cause those parts adjacent the slots to partake of a form whereby the strip is firmly held to the belt, whilst also providing the necessary jaws for gripping the cartridge.

The holders or clips will each have the necessary inward projection or projections for engaging the "cannelure" groove, or end flange, of the cartridge, and thereby holding the cartridge in the required position within the holder or clip, prior to its ejection or extraction therefrom by the firing mechanism of the machine gun.

In the accompanying drawings:

Fig. 1 is an edge view, and

Fig. 2 a plan view of the single strip from which the first described example of holder or clip is made.

Fig. 3 is an end view, and

Fig. 4 a side view of the strip after being folded, but prior to shaping and fixing, each view also showing a portion of the belt.

Fig. 5 is a cross-section of the holder or clip after shaping and fixing, and a longitudinal section of that portion of the belt to which it is fixed.

Fig. 6 is longitudinal section of the same holder or clip and a cross-section of the belt, and in broken lines shows a cartridge held by the holder or clip.

Fig. 7 is a perspective view and

Fig. 8 a geometric plan view of a pair of holders or clips, each made from a single strip as shown in Figs. 1 to 6, the views also showing portions of the belt to which such holders or clips are fixed.

Fig. 9 is a perspective view of a holder or clip made according to Figs. 1 and 2, but with slot-like perforations in the upper arm part to reduce weight.

Fig. 10 is a plan view of the strip from which such holder or clip is formed.

Fig. 11 is a plan view of an alternative form of the single strip, and

Fig. 12 a side view of the same strip after being folded and applied to the belt.

Fig. 13 is an end view,

Fig. 14 a side view, and

Fig. 15 a plan of a further modification of Figs. 1 and 2.

Fig. 16 is an end view,

Fig. 17 a side view, and

Fig. 18 a plan of a holder or clip made according to the second described example.

Figs. 19 and 20 are diagrammatic edge views of a portion of the improved cartridge belt folded upon itself to show how small the folds may be and how it allows of being folded and stored in small compass.

Fig. 21 is an end view,

Fig. 22 a side view, and

Fig. 23 a longitudinal section of a further example of two-part holder or clip, the views (except Fig. 22) also showing a portion of the belt.

Figs. 24 and 25 are perspective views of the two parts of the holder or clip shown in Figs. 21, 22 and 23.

Figs. 26 and 27 are plan views of the "blanks" from which the said two parts are formed. These several figures, 21 to 27, are drawn to an enlarged scale. Figs. 27a, 27b, 27c and 27d illustrate modifications.

Fig. 28 is a side view of the holder or clip shown in Figs. 21 to 27 drawn to a smaller scale and showing in broken lines a cartridge held by the holder or clip.

Fig. 28a is a like side view of an alternative form of the holder or clip to that shown in Figs. 21 to 23 and Fig. 28.

Fig. 28b is an enlarged perspective view of a modification of Figs. 21 to 27, and Figs. 28c and 28d are plan views of the two parts used to form the holder or clip shown in Fig. 28b.

Fig. 28e illustrates a modification of Fig. 28a.

Fig. 29 is a side view,

Fig. 30 is a longitudinal section, and

Fig. 31 a plan of a holder or clip made according to the fourth described example.

Figs. 32, 33 and 34 are like views to Figs. 29 to 31 of another form of the same example.

Fig. 35 is a side view of a further modification of Figs. 21 to 27. These several figures, 29 to 35 are drawn to an enlarged scale.

Fig. 36 is a plan view, and

Fig. 37 an end view of a further modification of Figs. 1 and 2.

Fig. 38 is a plan view and

Fig. 39 an edge view of a strip as used in producing one form of the fifth described example of holder or clip.

Fig. 40 is an end view, and

Fig. 41 a plan view of the same strip after being applied to the belt and shaped to produce and fix the holder or clip.

Fig. 42 is a plan view and

Fig. 43 an edge view of another example of slotted, single-strip from which a holder or clip may be formed, and Fig. 44 is an end view of the holder or clip formed out of such strip and fixed to a belt.

Fig. 44a is a plan view of a modification of Figs. 42 and 43.

Fig. 44b is a plan view, and

Fig. 44c an end view of a further example of slotted, single-strip holder or clip.

Fig. 45 is a plan of another example of slotted, single-strip, whilst

Fig. 46 is an end view, and

Fig. 47 a plan view of the same strip formed into a holder or clip and portions of the belt to which it is applied, these last two views being drawn to a larger scale to illustrate the construction and application more clearly.

Fig. 48 is a plan view of a modification of Fig. 45.

Referring now to Figs. 1 and 2, the strip therein shown is first cut out of thin sheet metal, such as mild steel, to the form and proportions shown. It is then folded upon itself to form the two arms $a, b$, and the free end of the lower and wider arm $b$ folded over the free end of the upper and narrow arm $a$, as shown in Fig. 3. This latter operation is done either after or before, the strip has been applied to the belt $c$ and transversely in one case, and endwise in the other case. The strip is then given the required initial clip shape in cross section, and, when in the correct position along the belt $c$, is subjected to pressure to cause the clip to grip the belt by reason of its compression and deformation, the clip, when fixed, having in cross-section the form shown in Fig. 5, and entirely enclosing the full width and edges of a portion of the belt. The side edge parts of the wider arm $b$ form the spring jaws $b^1$ by which the cartridge is gripped. The cartridges are inserted endwise (bullet-end first) into the holders or clips until the "cannelure" groove in the cartridge engages the small projection or "pip" $d$ on the inner face of the arm $b$, see Figs. 5 and 6.

As shown in Figs. 9 and 10, to reduce weight, the upper arm $a$ may be slotted and the belt $c$ threaded through the slots nearest its edges, the belt being visible through the central slot.

Instead of the upper arm $a$ being in the form of a single width, it may be in the form of two prong-like parts, see Fig. 11, the free ends of such parts, when folded down, being overlapped by the turned-up end part of the arm $b$, see Fig. 12. The side edges of the upper arm $a$ may be slightly curved as shown in Figs. 2 and 10, in order to prevent the same damaging the belt with any undue transverse flexing or bending of the same. In the case of Fig. 10, the outer slots will also be slightly curved.

As shown in Figs. 13, 14 and 15, the single metal strip for each holder or clip may be folded so as to cause its two ends to lie above the central part in forming the complete unit, the two ends lying near to each other.

Instead of comprising a single strip only, the improved holders or clips, as shown in Figs. 16, 17 and 18, may each comprise two strips $c^1$, $c^2$, overlapping at their ends, and one, the lower strip $c^2$, being wider than the upper strip $c^1$ in order to provide, after shaping, the jaws for gripping the cartridge. Owing to the strip arms or strips overlapping, and the holder or clip being of double thickness at the end which bears against the gun-breech when the cartridge is being ejected by the ejector slide of the machine gun, a broad and strong abutment is afforded for resisting any lateral displacement of the belt.

By reason of the belt being sandwiched between the upper and lower, or outer and inner, curved parts of the shaped holder or clip, the belt follows the same curvature. In each case, the belt engages and leaves the holder or clip at points which lie opposite, or approximately opposite, the axial centre line of the holder or clip, and thus allows of the belt having the maximum bending or folding properties. In this connection, Fig. 19 shows how small the bend can be when the belt is folded with the outer arched parts of the holders or clips outwards, and Fig. 20 how small it can be when the belt is folded with the outer arched parts inwards.

In Figs. 21 to 23 is shown another example of two-strip holder or clip, but, instead of the strips being joined to each other at their ends, the upper and narrower strip $e^1$ is made shorter, and joined at one end to the lower and wider strip $e^2$ at a distance away from one end of such strip by claws $e^3$ engaging slots $e^4$ in the strip, while the other end is joined by additional claws $e^5$ engaging the end of strip $e^2$, those parts of the strip $e^2$ where the slots come, and those parts where the claws $e^5$ engage the end of the strip $e^2$, being embossed to allow of the claws lying flush with the inner face of the holder or clip. The strip $e^2$ will be produced from the blank shown in Fig. 26, and the strip $e^1$ will be produced from the blank shown in Fig. 27, which, after initial shaping under pressure, assume the forms shown in Figs. 24 and 25 respectively, and on application to the belt partake, by deformation under pressure, of the final forms shown in Figs. 21, 22 and 23.

By reducing the length of the strip $e^1$, the holder or clip is of reduced thickness or diameter at one end, and no part of the belt overlies such end, therefore, in the case of a gun feed-box with lateral guide flanges, that end of the holder or clip of reduced thickness or diameter, allows of the belt passing through the feed-box without fouling said flanges.

In Fig. 28, the same holder or clip (drawn to a smaller scale) is shown fitted with a cartridge.

The holder or clip may be of reduced thickness or diameter at both ends, the outer and shorter strip $e^1$ being caused to engage the inner strip $e^2$ by means of claws engaging slots in the inner strip at points away from its ends, see Fig. 35.

In order that the cartridge may be more centrally held by each holder or clip and thus afford a better balance in the feeding of the belt through the feed box of the machine gun, the holders or clips may each be formed with an extension $e^6$, see Fig. 28a, provided with a small projection $d^1$ at its free end to engage the "cannelure" groove of the cartridge, see Fig. 28a. In the case of a cartridge with a small flange (instead of a groove) at its wider end, and requiring to be drawn out of the holder or clip according to the "four" stroke method of extraction and firing, the extension $e^6$ will be formed to engage the flange, see Fig. 28e.

As shown in Fig. 28b, instead of the claws $e^3$, $e^5$ being in one with the outer strip $e^1$, they may be in one with the inner strip $e^2$ and overlap the ends of the outer strip $e^1$. In Figs. 28c and 28d are shown the strips $e^1$, $e^2$ prior to being shaped and united.

To give additional thickness, and to provide for the effective engagement of the belt push-pawl in feeding the belt through the gun feed-box, one side or edge of each holder or clip may have a flange $i$, see Fig. 26, with serrated face on one side and folded back against the outer face of the rear jaw part of the holder or clip as shown in Figs. 21, 22, 24 and 35. To provide a like face on the side of each holder or clip for the belt-retaining pawl to engage, the upper face of each outer part $e^1$ of a holder or clip may also be milled or serrated at $e^7$ as shown in Figs. 22, 25, 27 and 35, and preferably, as shown, along both edge parts to allow of reversibility. In place of the flange $i$, the clip jaw may have an embossing $g^0$, see Fig. 27a, or a bent-out part $g^1$, see Fig. 27b.

As shown in Figs. 29 to 31, the improved holders or clips may each comprise a single strip $f$ of thin sheet metal (preferably mild steel), with its central part embossed outwardly and formed with a slot $f^1$ near to each longitudinal edge of the embossing, the belt $c$ being passed through the slots and within the embossing prior to fixing. To fix the strip to the belt, a wire staple $g$ is used, which extends across the underside of the belt, whilst its two upturned ends project through holes in the strip $f$ to right and left of the embossing, and are then folded down towards each other, the application of pressure to the embossing and staple and the clip as a whole then causing the necessary deformation for fixing the holder or clip to the belt.

In lieu of the wire staple, claws $h$ cut out of the end parts of the strip $f$, see Figs. 32, 33 and 34, may serve for fixing the holder or clip to the belt, the claws extending part way across the belt, and on pressure being applied to the strip and claws, causing the necessary deformation for finally shaping and fixing the holder or clip to the belt.

These last described examples of holders or clips have like advantages to the holders or clips shown in Figs. 21 to 23, and Fig. 35, in regard to their free passage between the usual guide flanges of the feed-box of the machine gun. They, like those in Figs. 21 to 23, have the further advantage of being relatively light in weight.

Each holder or clip will have the serrated flange $i$, or the embossing $g$, Fig. 27a, or bent-out part $g^1$, Fig. 27b for the belt push-pawl to engage, and likewise, the outer face of the embossing $g$ will be serrated for the belt-retaining pawl to engage. In the case of the holder or clip for the larger size of cartridge, it will have an end projection $x$ as shown in Fig. 27c and Fig. 27d.

Instead of the projection $d$ being in, or on the inner central face part of the holder or clip, it may be in, or on one of the jaws, see Figs. 21, 22, 24, 26, 29, 32 and 35.

As shown in Figs. 36 and 37, which is a modification of Figs. 1 and 2, the upper arm part $a$, when folded down, is adapted to pass, at its free end, through a slot $b^x$ in the part $b$, situated at a distance from the free end of such part, and, on the strip being finally shaped and fixed to the belt, provide a holder or clip of reduced diameter at one end.

In Figs. 38 to 41, a further example of single strip holder or clip is shown, each strip $a$ being rectangular in plan, and having a U-shaped slot $j$ near to each of its two longitudinal edges. In proceeding to apply the strip to the belt, the latter is threaded first through one slot, then passed over the middle part of the strip, and then threaded through the other slot, those parts $a^2$ of the strip lying within the area enclosed by the U formation of the slots being previously bent down out of the plane of the strip, see Fig. 39, whilst the edge parts $b$ of the strip are folded back against the belt, the complete strip, when finally shaped and fixed, being of the shape shown in Figs. 40 and 41, the parts $a^2$ forming the jaws by which the cartridge is gripped.

In Figs. 42 to 44 another example of single strip holder or clip is shown, there being two parallel slots $k$ near to each of the longitudinal edges of the strip $a$ and each of the two slots providing between them a central part $l$, which is slightly raised out of the plane of the strip to allow the belt to pass through the slots and below such raised part, as well as to pass over the central portion of the strip, and so that, on pressure being applied to the strip to give it the required shape, and to fix it to the belt, such pressure also causes the necessary deformation of the slotted parts to grip the belt, the edge parts $m$ forming the jaws for gripping the cartridge, see Fig. 44.

As shown in Fig. 44a, instead of the parts $l$ of the strip $a$ being in one piece, they may be divided, and thus allow of each half part being first raised, and then folded down on to the belt, after the latter has been caused to lie across the strip, and as shown in Figs. 44b and 44c, the slots $k$ may extend only a short distance across the strip $a$ and leave a central part of the strip between them, the parts $l$ being adapted to lie only over the edge or outer portions of the belt. In Figs. 45 to 47 a further example of single strip holder or clip is shown with the strip $a$ having a single straight slot $n$ near to each of its longitudinal edges, the strip being of a width allowing of the slotted edge parts $b$ to be folded back towards the upper face of the central portion of the strip, so that, with the belt $c$ first threaded through one slot, then passed over the central portion of the strip, and then threaded through the other slot, pressure will serve to cause the edge parts $b$ to engage the belt, and, under deformation of the said parts and the strip proper in responding to the thickness and form of the belt, thereby grip the belt. The folded parts $o$ form the necessary cartridge-gripping jaws. As shown in Fig. 48, one edge of each slot may be serrated to cause it more effectively to engage the belt.

In these last described examples, Figs. 38 to 48, the holder or clip is of single thickness from end to end of its central part, and at each end is of reduced diameter for the major portion of such ends. When the holders or clips require to pass between the usual guide flanges of the machine gun feed-box, the belt will be narrow, whilst the holders or clips may be almost the full width of the feed-box.

In each example, the holders or clips contact with the edges of the belt, and thereby serve to locate the same in relation to the width of the belt, whilst the final shaping and fixing of the holders or clips by deformation under pressure serves to locate the holders or clips at the correct distances apart along the belt.

To prevent or reduce the possibility of the ejector slide of the machine gun feed-box fouling the holders or clips, or vice versa, as the slide moves to and fro, the front end corner part $e^8$ of one jaw of each holder or clip may be cut away or filed off as shown in Figs. 23, 24, 26, 28d, 30 and 33.

In the case of holders or clips for holding cartridges of the larger kind (say 15 mm., or 20 mm.), each holder or clip may have a small projection $x$ at one end (see, for example, Figs. 27c and 27d) for slidably engaging the usual straight groove in the side wall of the gun feed-box, and thereby preventing any tilting or rocking of the holder or clip about its axis, and interfering with the movements of the ejector slide, or cartridge.

Although describing the holders or clips as being made wholly of metal, they may, in the case of two-part holders or clips, be made partly of metal and partly of another and suitable material. For example, in the case of the two-part holders or clips shown in Figs. 21 to 28 and Fig. 35, the inner part $e^2$ may be made of synthetic resin, and the outer part $e^1$ of metal, whilst, in the case of the two-part holder or clip shown in Fig. 18 or 28b, the inner part $e^2$ may be made of metal, and the outer part $e^1$ of synthetic resin.

Whilst chiefly applicable to quick-firing machine-gun cartridge belts, the invention may also be applied to automatic rifle cartridge belts.

What we claim is:

1. A method of making a cartridge holding belt which comprises providing a relatively long flexible belt of uniform width, forming a flat, relatively stiff plate adapted to be bent to form a cartridge holding clip, placing a second flat member in cooperative relation with said plate to define a belt-receiving space, interposing said belt in said space between said clip and member, and subjecting said plate and member to sufficient pressure to deform the same to a section of an annulus which grips and fixedly holds said belt and interlocking said plate and member while maintaining said pressure.

2. A method of making a cartridge holding belt which comprises providing a relatively long flexible belt of uniform width, forming a flat, relatively stiff plate adapted to be bent to form a cartridge holding clip, placing a second flat member integral with and in cooperative relation with said plate to define a belt-receiving space, interposing said belt in said space between said clip and member, and subjecting said plate and member to sufficient pressure to deform the same to a section of an annulus which grips and fixedly holds said belt and interlocking said plate and member while maintaining said pressure.

3. A method of making a cartridge holding belt which comprises providing a relatively long flexible belt of uniform width, forming a flat, relatively stiff plate adapted to be bent to form a cartridge holding clip, placing a second flat member separate from and in cooperative relation with said plate to define a belt-receiving space, providing interlocking means on said plate and member and interengaging the same to form a rigid structure, interposing said belt in said space between said clip and member, and subjecting said plate and member to sufficient pressure to deform the same to a section of an annulus which grips and fixedly holds said belt and interlocking said plate and member while maintaining said pressure.

4. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having an arcuate portion of sheet material adapted to grip a cartridge in its concave face, said flexible belt lying on the convex face thereof, a cover member overlying said flexible belt and concentric with said arcuate portion, and claws on one of said members lying against the other for uniting said arcuate portion and said cover extending around the lateral edges of said flexible belt, those parts of said other member against which said claws lie being embossed so that they are flush with the face thereof.

5. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having an arcuate portion of sheet material adapted to grip a cartridge in its concave face, said flexible belt lying on the convex face thereof, a cover member overlying said flexible belt and concentric with said arcuate portion, and means for uniting said arcuate portion and said cover extending around the lateral edges of said flexible belt, said covers and clips constructed and arranged to cooperate to grip and fixedly hold said flexible belt, slots in said clips, said cover being secured through said slots.

6. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having an arcuate portion of sheet material adapted to grip a cartridge in its concave face, said flexible belt lying on the convex face thereof, a cover member overlying said flexible belt and concentric with said arcuate portion, and means for uniting said arcuate portion and said cover extending around the lateral edges of said flexible belt, said covers and clips co-operating to grip and fixedly hold said flexible belt, said covers being separate from said arcuate portions, slots in said clips, said cover being secured through said slots.

7. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having an arcuate portion of sheet material adapted to grip a cartridge in its concave face, said flexible belt lying on the convex face thereof, a cover member overlying said flexible belt and concentric with said arcuate portion, and means for uniting said arcuate portion and said cover extending around the lateral edges of said flexible belt, said covers and clips co-operating to grip and fixedly hold said flexible belt slots in said clips, said cover being secured through said slots, at least one end of said arcuate portions extending beyond said belt and covers.

8. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having an arcuate portion of sheet material adapted to grip a cartridge in its concave face, said flexible belt lying on the convex face thereof, a cover member overlying said flexible belt and concentric with said arcuate portion, and means for uniting said arcuate portion and said cover extending around the lateral edges of said flexible belt, said covers and clips co-operating to grip and fixedly hold said flexible belt, said covers being separate from said arcuate portions and being arcuate portions, and a second set of interlocking means embracing an edge of said flexible belt and means on said covers embracing one end of said arcuate portions, and a second set of interlocking means embracing an edge of said flexible belt and anchored in said arcuate portions and spaced from the other end of said arcuate portion.

9. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having an arcuate portion of sheet material adapted to grip a cartridge in its concave face, said flexible belt lying on the convex face thereof, an arcuate cover member overlying said flexible belt and concentric with each of said arcuate portions, one end of said covers being integral with the corresponding end of said arcuate portions, the other end being anchored in said clips.

10. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having an arcuate portion of sheet material adapted to grip a cartridge in its concave face, said flexible belt lying on the convex face thereof, a cover member overlying said flexible belt and concentric with each of said arcuate portions, one end of said covers being integral with the corresponding end of said arcuate portions, the other end of said covers being folded around the edge of said flexible belt and locked to said clips at points spaced from the other end of said arcuate portions.

11. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having a plurality of slots and having an arcuate portion of sheet material adapted to grip a cartridge in its concave face, said flexible belt lying on the convex face thereof, a cover member overlying said flexible belt and concentric with said arcuate portion, and means for uniting said arcuate portion and said cover extending around the lateral edges of said flexible belt, said cover and clips co-operating to grip and fixedly hold said flexible belt, said covers being separate from said arcuate portions and being secured thereto by a plurality of sets of interlocking elements, one set of said interlocking means on said covers embracing one end of said arcuate portions and a second set of interlocking means embracing an edge of said flexible belt and passing through said slots in said arcuate portions.

12. A cartridge holding belt comprising a relatively long and narrow flexible belt of uniform width, a plurality of elongated spaced cartridge clips secured at regular intervals to said flexible belt, the centerlines of said clips being transverse to said flexible belt, each of said clips having an arcuate portion of sheet material arranged to grip a cartridge in its concave face, said flexible belt lying on the convex face thereof, a cover member overlying said flexible belt and concentric with said arcuate portion, and means for uniting said arcuate portion and said cover extending around the lateral edges of said flexible belt, said cover constructed and arranged to exert pressure upon said belt over the entire inner surface of said cover in cooperation with the adjacent surface of said clip to fixedly hold said belt.

GEORGE FREDERICK FRENCH.
ROGER FRENCH.